United States Patent
Dorenbosch

(10) Patent No.: US 6,430,408 B1
(45) Date of Patent: Aug. 6, 2002

(54) ALLOCATING ANTENNA-PROVIDED COMMUNICATIONS SERVICES

(75) Inventor: Jheroen Pieter Dorenbosch, Paradise, TX (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/571,185

(22) Filed: May 16, 2000

(51) Int. Cl.⁷ ................................................ H04M 3/42
(52) U.S. Cl. ........................ 455/414; 455/406; 455/407
(58) Field of Search ................................. 455/414, 450, 455/406, 407, 408, 411, 433, 404, 403; 379/114, 115, 130, 132

(56) References Cited

U.S. PATENT DOCUMENTS

| | | | |
|---|---|---|---|
| 4,682,180 A | 7/1987 | Gans | 343/769 |
| 4,751,728 A * | 6/1988 | Treat | 379/113 |
| 5,303,297 A * | 4/1994 | Hillis | 455/406 |
| 5,508,707 A * | 4/1996 | LeBlanc et al. | 342/457 |
| 5,577,100 A * | 11/1996 | McGregor et al. | 455/406 |
| 5,586,338 A * | 12/1996 | Lnych et al. | 455/433 |
| 5,590,156 A * | 12/1996 | Carney | 375/316 |
| 5,604,528 A * | 2/1997 | Edwards et al. | 348/5.5 |
| 5,606,602 A * | 2/1997 | Johnson et al. | 379/115 |
| 5,608,446 A * | 3/1997 | Carr et al. | 725/114 |
| 5,613,213 A * | 3/1997 | Naddell et al. | 455/414 |
| 5,646,984 A * | 7/1997 | Oda | 379/114 |
| 5,781,620 A * | 7/1998 | Montgomery et al. | 379/115 |
| 5,802,502 A * | 9/1998 | Gell et al. | 705/37 |
| 5,862,471 A * | 1/1999 | Tiedemann, Jr. et al. | 455/406 |
| 5,915,214 A * | 6/1999 | Reece et al. | 455/406 |
| 5,918,172 A * | 6/1999 | Saunders et al. | 455/404 |
| 5,924,020 A * | 7/1999 | Forssen et al. | 455/129 |
| 5,974,308 A * | 10/1999 | Vedel | 455/407 |
| 5,983,092 A * | 11/1999 | Whinnett et al. | 455/406 |
| 6,009,154 A * | 12/1999 | Rieken et al. | 379/144 |
| 6,037,912 A | 3/2000 | DeMarre | 343/815 |
| 6,058,309 A * | 5/2000 | Huang et al. | 455/433 |
| 6,101,379 A * | 8/2000 | Rahmann et al. | 455/406 |
| 6,104,792 A * | 8/2000 | Lautenschlager et al. | 379/114 |
| 6,185,413 B1 * | 2/2001 | Mueller et al. | 455/404 |
| 6,195,543 B1 * | 2/2001 | Granberg | 455/407 |
| 6,205,135 B1 * | 3/2001 | Cinni et al. | 370/356 |
| 6,269,157 B1 * | 7/2001 | Coyle | 379/114 |
| 6,310,952 B1 * | 10/2001 | Baldwin et al. | 379/266.1 |

* cited by examiner

Primary Examiner—Dwayne Bost
Assistant Examiner—Joy K. Contee
(74) Attorney, Agent, or Firm—Charles W. Bethards; Roland K. Bowler, II

(57) ABSTRACT

A communications system having an antenna and at least one mobile unit in communications with the antenna. A price that a mobile unit will pay to receive an enhanced communications service is established. The antenna provides the enhanced communication service to the mobile unit paying the price.

13 Claims, 3 Drawing Sheets

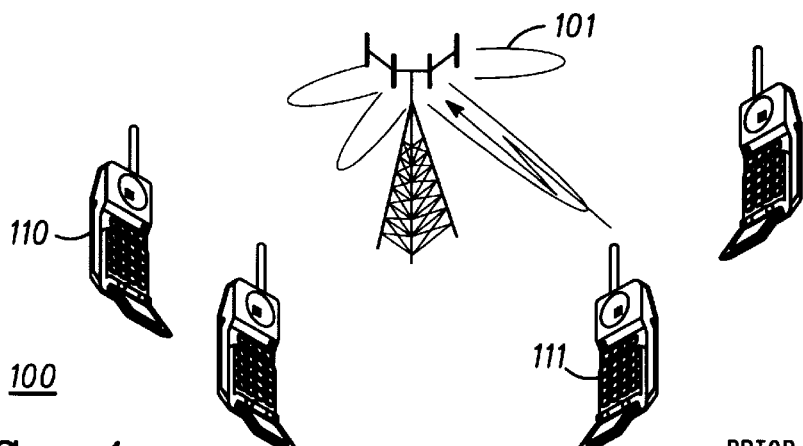
FIG. 1 —PRIOR ART—
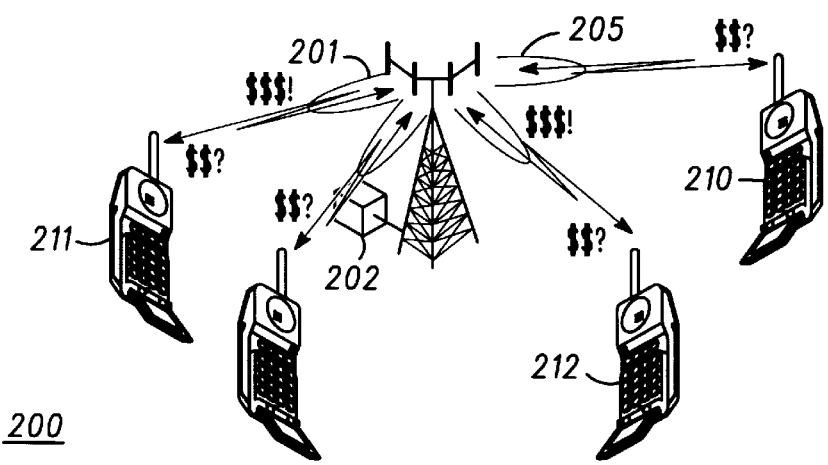
FIG. 2
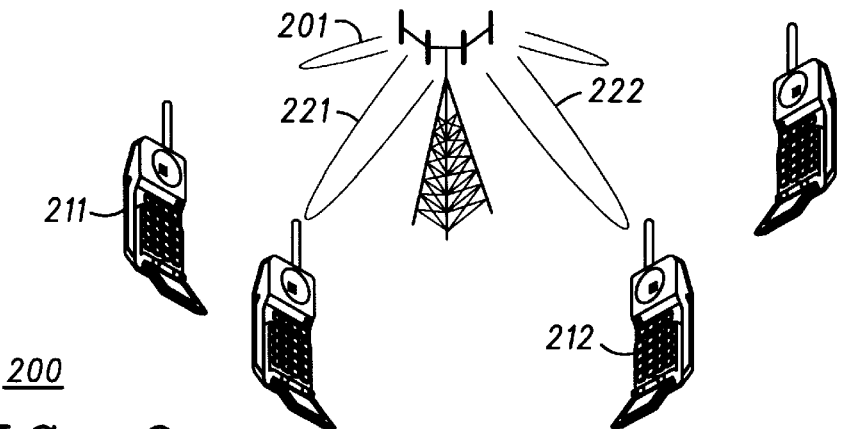
FIG. 3

ALLOCATING ANTENNA-PROVIDED COMMUNICATIONS SERVICES

FIELD OF THE INVENTION

The present invention relates to apparatuses and methods for allocating communications-related services provided by a base station site to mobile units in communication with an antenna of the base station site.

BACKGROUND OF THE INVENTION

Communications systems often employ a base station site which communicates via RF links with a plurality of mobile units. The base station site typically contains an antenna and an antenna controller. For example, in a cellular telephone system, the base station site for a given cell includes an antenna and controller, which can communicate with a plurality of cellular telephones (mobile units) within the cell. Each mobile unit, as well as the base station site, thus has a transceiver. Each mobile unit is typically utilized by a subscriber or customer of a communications system of which the base station is part.

Various communications schemes may be employed to permit RF communications between the base station and the mobile units, such as time division multiple access (TDMA), frequency division multiple access (FDMA), code division multiple access (CDMA), and combinations of such schemes. Both digital and analog communications are possible. Various modulation schemes are employed, such as carrierless amplitude/phase (CAP) and quadrature amplitude modulation (QAM).

The base station thus provides communication services, such as supporting communications on inbound and outbound links, to each mobile unit. The terms inbound and outbound are used herein from the perspective of the antenna. Thus, inbound refers to transmissions from a mobile unit to a base station antenna, and outbound refers to transmissions from the base station antenna to the mobile units.

Smart antennas are often used to improve the signal-to-noise ratio of the inbound and outbound links. Referring now to FIG. 1, there is shown a prior art communications system, employing a smart, directional antenna 101 and a plurality of mobile units 110. In such a system, directional antenna 101 typically attempts to optimize the outbound and inbound signal for a given mobile unit 111. This may be done, for example, by extending a lobe in the direction of the mobile unit to obtain a better signal-to-noise ratio, as illustrated. This improves the communications links provided to the mobile unit by the antenna and base station, and thus provides a longer range or a higher data rate for that mobile unit.

Advanced smart antennas can generate multi-lobe patterns that can provide improved or enhanced service to more than one mobile unit at a time. For example, a given smart antenna may be able to selectively extend two or more lobes at a given time. The number of lobes that can be extended is typically limited, however, by physical, design, economic, or other constraints.

Because the services available, such as lobe extensions and the resulting improved communications links, are limited, the base station controller unit must somehow allocate these limited services (scarce resources) to existing mobile units. In one scheme, the controller attempts to treat all mobile units equally. However, this results in more or less uniform, and potentially poor, service. This may be referred to as a socialist or egalitarian solution. Alternatively, the base station can attempt to allocate resources so as to optimize some global system performance characteristics. Such approaches, however, do not effectively allocate scarce resources to the most urgent subscribers. There is a need, therefore, for improved techniques for allocating scarce base station communications-related resources to mobile units in need of these resources.

BRIEF DESCRIPTION OF THE DRAWINGS

These and other features, aspects, and advantages of the present invention will become more fully apparent from the following description, appended claims, and accompanying drawings in which:

FIG. 1 is a diagram of a prior art communications system, employing a smart, directional antenna and a plurality of mobile units;

FIG. 2 is a diagram of a capitalist communications system, employing a smart, directional antenna and a plurality of mobile units, in accordance with an embodiment of the present invention;

FIG. 3 illustrates the improvement of service by the extension of lobes in the system of FIG. 2;

DETAILED DESCRIPTION OF THE INVENTION

Figure 4:
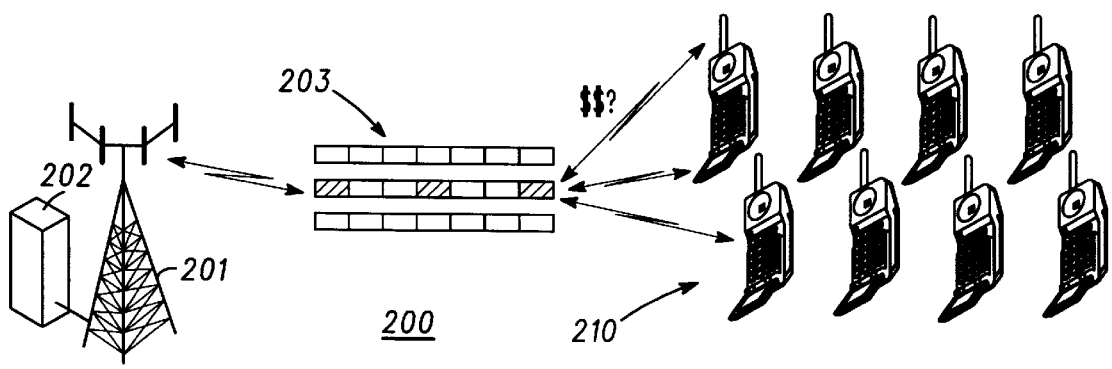
FIGS. 4–6 illustrate the improvement of service by increasing the bit rate of given links in the system of FIG. 2.

The present invention permits each mobile unit to bid for desired communications services provided by the base station site, so as to efficiently allocate these services to the must urgent needs. The services include improved or enhanced services related to communications links between the mobile unit and antenna, such as lobe extensions, which improve inbound and/or outbound S/N (quality), and increased bit rate (bandwidth, or quantity). The bidding may be in terms of actual or proxy dollars, tokens, or some other limited quantity allocated to or associated with each mobile unit. The bidding process may be initiated by the base station or by the mobile unit, and may be in the form of fixed, specified prices or in some auction or bidding format. In addition, although each mobile unit bids for services that are provided by the base station and antenna, but the mobile unit may negotiate for such services with either the base station itself or with another mobile unit of the system. As opposed to the "socialist" systems described above, the present system may be considered to be a "capitalist" type of system. These and other features of the present system are described in further detail below.

Directional Antenna with Lobe Extensions

Referring now to FIG. 2, there is shown a diagram of a capitalist communications system, employing a smart, directional antenna 201 and a plurality of mobile units 210, in accordance with an embodiment of the present invention. Directional antenna 201 comprises a number of arrays, indicated as vertical lines on antenna 201. As will be appreciated, directional antenna 201 may be controlled by controlling the phases between the elements of an antenna array. This is typically done by an antenna or system controller 202, which, like antenna 201, may be considered to be part of base station site 205. In the present invention, the term "antenna" may be used to refer collectively to the antenna 201 and its controller 202. A service may be considered to be provided by the antenna, or by the larger communications system of which it is part. A message transmitted to one or more mobile units 210 may be considered to be transmitted by the antenna 201, or base station site 205. Likewise, a transmission from a mobile unit 210 may be considered to be received by the antenna 201 or base station site 205.

As shown, each mobile unit 210 (which may be, for example, a cell phone) communicates with antenna 201 and its controller 202 by an RF link. In such a system, directional antenna 201 may have the ability to provide up to two relatively high-quality links (by extending lobes), and a number of lower-quality links for standard service.

In an embodiment, antenna 201 provides higher-quality communications links by extending lobes toward the mobile units willing to pay a price for this service. Antenna 201 may offer better sensitivity to improve the inbound link, more power to improve the outbound link, or both. The process by which a price is set for enhanced services provided by the base station may be referred to as a negotiation or bidding process. The bidding process may be initiated, in respective embodiments, by either the base station itself or by a mobile unit.

Antenna Offering Higher-Quality Links

In one embodiment, the bidding process is initiated by the antenna offering enhanced services to all mobile units at a specified price, and providing the service to units that positively respond. In this embodiment, antenna 201 transmits a message (indicated by "$$?" in FIG. 2) to each of mobile units 210, 211, 212, specifying a certain price for a better connection. This price may be set ahead of time by the antenna controller 202, at an estimated "market clearing" price. Such a price may be selected in accordance with various techniques, for example based on current information and other assumptions about current demand.

In the example shown in FIG. 2, two units, such as units 211 and 212, may respond to the offer with ("$$$!"), agreeing to pay the specified price for the better connection. As shown in FIG. 3, antenna 201, under the control of its controller 202, then extends lobes 221, 222 in the direction of the paying mobile units 211, 212, respectively. This can improve both the inbound and outbound links for these units (and also for any other units coincidentally lying within these extended lobes). Thus, each of mobile units 211, 212 receives enhanced service (i.e., improved S/N due to lobe extension) as a result of paying the specified price.

In the case where too many mobile units accept the bid, the base station selects some of the responding mobile units, either arbitrarily or in accordance with some other criteria. Alternatively, the base station can repeat the process at an increased price, until the largest number of mobile units that the base station can provide with the enhanced service accept the offer, i.e. until the "market is cleared". Similarly, if the number of mobile units accepting the price is too low (i.e., none, or fewer than can be accommodated at the higher service under existing conditions), then the price may be lowered until the market is cleared, to maximize "profits". Thus, in one embodiment, antenna 201 begins negotiations by transmitting an initial price to the mobile units. After receiving a response from the mobile units, the price is changed, if necessary, and the process repeated, until a sufficiently market-clearing price is achieved.

The present invention thus provides a technique to establish a price a mobile unit will pay to receive an enhanced communications service. In the present embodiment, the price at which the enhanced communications service will be provided to one or more units is established by the antenna offering a price, and by this price being accepted by the accepting units.

In this manner, profits of the service provider operating the base station site 205 are maximized by utilizing available resources instead of letting them go unused. Further, overall efficiency is improved because the scarce resources of the limited services available are allocated to the most urgent needs, as indicated by willingness to pay the higher prices for these services.

Automatic Negotiation

In an embodiment, the bidding process is performed automatically at both the base station and mobile unit ends. For example, base station 205 automatically selects a price and offers improved communications services at this price. This may be done at predetermined times (such as peak demand time), or whenever a high demand for such services is detected from the mobile units, or whenever enhanced service capacity is available and not being used. Upon receipt of the offer from the base station antenna 201, each mobile phone can automatically decide whether or not accept the offer, in accordance with predetermined criteria, such as its own link's signal-to-noise ratio, in accordance with a "stinginess" parameter set by a user. The mobile unit may also consult its own resources (e.g. the amount of money available) and choose not to accept the offer if the amount of available money is too low, e.g. below a threshold). Alternatively, a mobile unit may prompt its user to ask whether to spend money to upgrade a specified service.

Placing Lobe Extensions for Bid

In an embodiment, instead of antenna 201 offering an initial price, antenna 201 transmits a "bid message" to the mobile units, notifying them that a given service is available for bid. The base station then compares the resulting bids, and awards the available increased services to the highest bidders (or to highest bidders that exceed a predetermined bid threshold or floor).

For example, the base station antenna 201 may have the ability to selectively extend at most two lobes. It transmits a message "high-quality link (at specified higher S/N ration) up for bid" to each mobile unit 210. A given mobile unit may decide how important it is to obtain the improved link. For example, mobile unit 211 may have a dangerously low S/N ratio and may thus bid, say, $1.00 for the link upgrade, while a mobile unit with a higher S/N ratio may bid only $0.25 or even nothing.

The transmission of this "bid message" may be triggered in a number of ways. In an embodiment, the bid message is transmitted by the antenna whenever the antenna receives, from at least one of the mobile units, a request for the enhanced communications service.

In an alternative embodiment, the enhanced communications service provided to a given mobile unit may be provided by another base station site of the communications system. Thus, for example, a mobile unit currently serviced by base station site 205 may place the winning bid for an enhanced communication service such as the improved quality associated with a lobe extension. However, in order to provide this enhanced service to the mobile unit, antenna controller 202 of base station site 205, or some other controller of the communications system of which base station site 205 is a part, may decide to have a second base station site provide the lobe extension to the mobile unit.

Mobile Unit-Initiated Bidding

In an alternative embodiment, the negotiation and bidding may be driven and initiated by a given mobile unit, instead of by the base station. Thus, a mobile unit desiring a service (such as improved S/N on inbound and/or outbound links) can offer the base station money for a better connection, or indicate its willingness to bid for such a connection. Thus, the price a mobile unit will pay to receive an enhanced communications service may be established pursuant to the highest or best bids received from bidding mobile units, in either an antenna or mobile unit-initiated bidding process.

As will be appreciated, in an embodiment, the antenna 201 is controlled by controller 202, which handles the negotiation and changes in services resulting from such negotiations. In such a system, the controller receives information about link quality for each mobile, from the antenna, and instructs the antenna as to which mobile to provide higher service quality. The negotiation, in an embodiment, takes place at or near the application layer.

Improved Bandwidth

Figure 5:
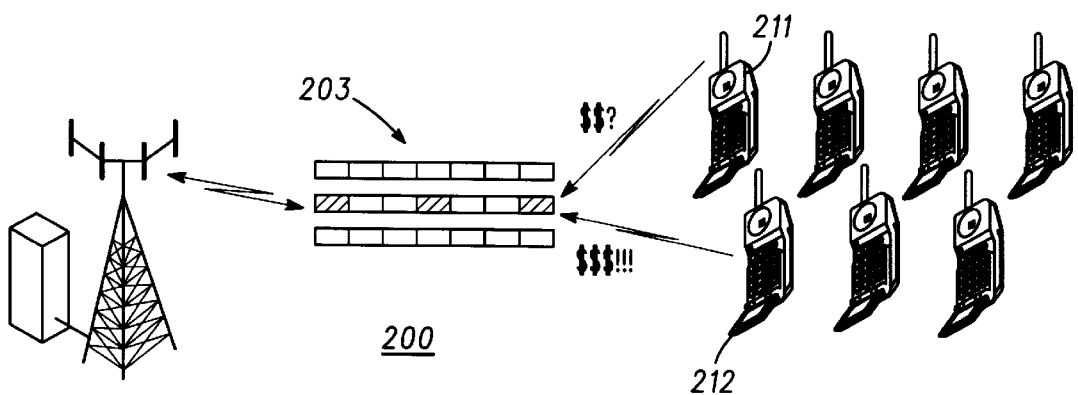
Figure 6:
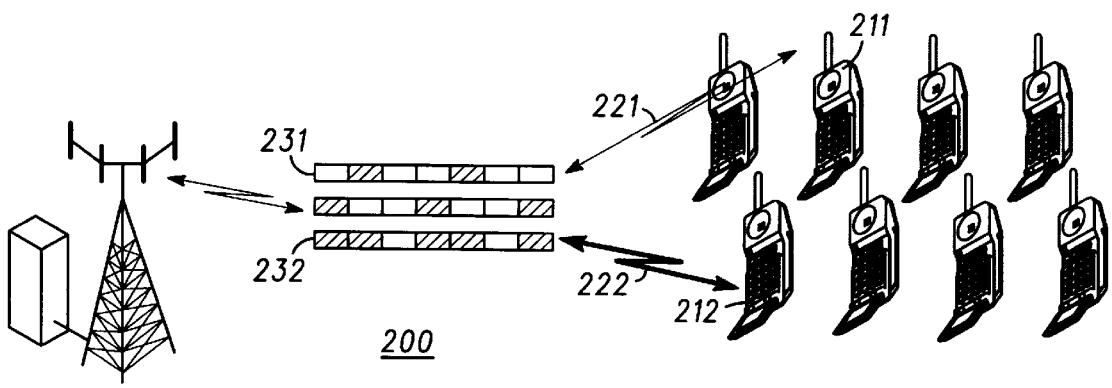

In addition to extending a lobe for a given mobile unit to improve the S/N ratio of the inbound and outbound links for specified mobile units, other communications-related services may be allocated pursuant to a bidding process. In an embodiment, for example, a higher bit rate (bandwidth) may be allocated to a given mobile unit. FIGS. 4–6 illustrate the improvement of service by increasing the bit rate of given links in the system of FIG. 2. As shown in FIG. 4, controller 202 is connected to base station antenna 201. The antenna 201 communicates via RF link 203 with a plurality of mobile units 210. The rectangular structure of link 203 indicates the division of bandwidth per mobile unit in accordance with some communication scheme. For example, the structures of link 203 may represent the time slices or slots of a TDMA scheme by which the antenna communicates with mobile units within its geographic range.

The bidding process for enhanced bandwidth may be initiated by antenna 201, as described above with respect to FIG. 2. At a given time, controller 202 may determine that there is increased demand for bandwidth or other communications-related services. For example, this may be done at peak demand times, as described above. When controller 202 wishes to bid out bandwidth, as shown in FIG. 4, a message is transmitted from controller 202, via antenna 201 and link 203, to the mobile units 210, indicating the prices for various bandwidths (bit rates). A comparatively higher bit rate and bandwidth is provided, as will be appreciated, by allocating a comparatively larger number of slots per TDMA structure or second to a given link. Antenna 201 need not be a directional antenna in order to offer different bandwidth links to different mobile units, because different bandwidth allocation schemes may be employed even with omnidirectional antennas.

Different levels of enhanced service may be offered at different prices. For example, a base level of service may be provided to any mobile unit desiring access, while a higher, intermediate or medium level bit rate may be offered for a given price ($$). A still higher bit rate may be offered at a highest price ($$$).

As shown in FIG. 5, two cell phones 211, 212 reply on their respective inbound links, indicating agreement to pay one of the specified prices. Phone 211 may desire an intermediate improvement in service and thus pays the intermediate price ($$) while phone 212 may agree to pay the highest price ($$$) for the highest bandwidth service. After receiving these messages from mobile units 211, 212, controller 202 allocates bandwidth to the paying mobile units, as illustrated in FIG. 6. An extra two time slots in TDMA time slot field 231 may be allocated to mobile unit 211, resulting in a medium bit rate link, as indicated by medium-thickness line 221. An extra five time slots in TDMA time slot field 232 may be allocated to mobile unit 212, resulting in a high bit rate link, as indicated by thick line 222.

Peer-to-Peer Bidding

As described above, the bidding process to allocate bandwidth may also be in the form of a bid message transmitted by antenna 201, or may be initiated by the mobile units desiring more bandwidth. Alternatively, instead of a mobile unit purchasing or bidding for services directly from the base station controller, in an alternative embodiment, a mobile unit may negotiate with peer mobile units to purchase some or all of the service currently allocated to the peer mobile units.

Figure 7:
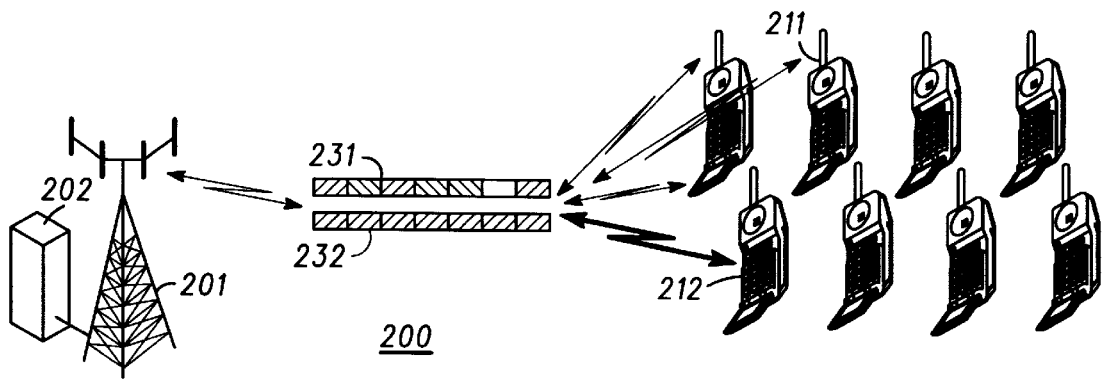
FIGS. 7–9 illustrate service negotiation among peer mobile units in the capitalist communications system of FIG. 2.
Figure 8:
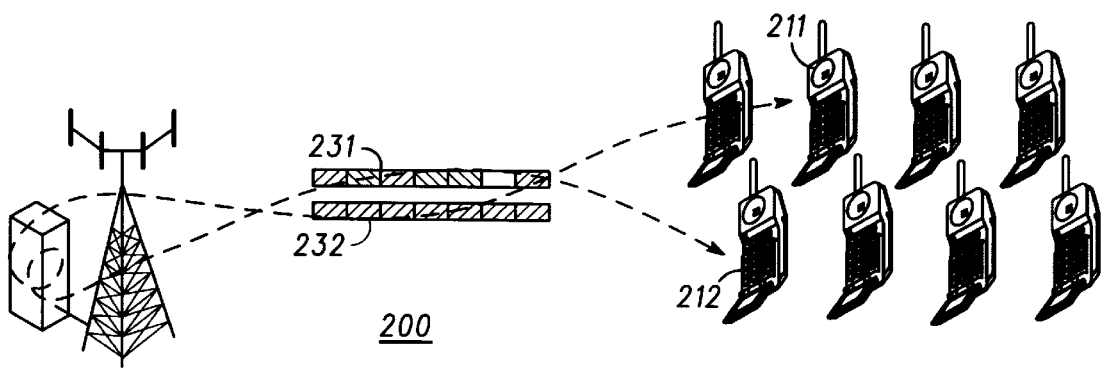
Figure 9:
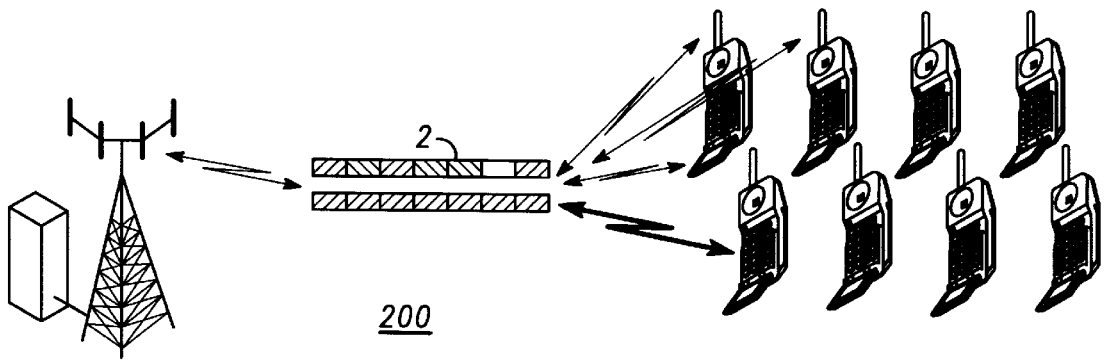

Referring now to FIGS. 7–9, there is illustrated service negotiation among peer mobile units 210 in the capitalist communications system 200 of FIG. 2. Normally, a service such as bandwidth is scheduled and allocated by the system controller 202. In some cases, a given mobile unit, e.g. mobile unit 211 of FIG. 7, may desire a high bandwidth channel, but all channels may already be allocated by controller 202 to other mobile units. Thus, mobile unit 211 observes the control channel to determine how the bandwidth is currently allocated. As can be seen, in the example shown in FIG. 7, mobile unit 212 has a high bandwidth channel, indicated by the thicker line representing its link, and by use of all seven time slots of TDMA field 232. TDMA field 231, by contrast, allocates its seven time slots to several different mobile units, including mobile unit 212. The units serviced by TDMA field 231 thus have lower bandwidth links than that of mobile unit 212.

After determining that mobile unit 212 has a high bandwidth channel, mobile unit 211 contacts mobile unit 212 via controller 202, as shown in FIG. 8. Mobile unit 211 offers compensation to mobile unit 212 to release the high bandwidth channel represented by TDMA field 232. The offer is an offer of payment of some sort, and may be in terms of money, tokens, favors to be returned in the future, and so forth. Whatever the form in which payment is to be made, whether money or not, the payment to be made may be referred to as the price of the enhanced communications service. If mobile unit 212 accepts, it accepts the payment (or the agreement to pay) and releases the channel "in favor" of mobile unit 211. This releasing directs controller 202 to allocate the high bandwidth channel provided by TDMA field 232 to mobile unit 211 (FIG. 9).

In some implementations, such as CDMA systems, it may be difficult for a mobile unit to monitor the control channel. Thus, in an alternative embodiment, controller 202 may display a list of mobile units that currently have a high bandwidth channel.

In an alternative embodiment of a peer mobile unit negotiation system such as that depicted in FIGS. 7–9, services other than bandwidth, e.g. improvements in S/N ratio (lobe extensions), may be bid for. In another alternative embodiment, the mobile unit desiring a service contacts multiple mobile units having this service, to establish the lowest price for the extra service. In yet another embodiment, a mobile unit having use of a given service but not needing the service, or willing to entertain offers to sell, can contact other mobile units not having the service and offer to sell the service to them.

As described above, the present invention provides a way to dynamically change the quality of service provided, in response to highest bids by users who most urgently desire the services. Unlike previous antenna service allocation techniques, therefore, in a mobile system having high demand for limited bandwidth, the present invention responds well to the instantaneous opportunities for increasing revenue for the service provider. In addition, the users receive useful feedback regarding the cost of the extra bandwidth or other desired services.

Payment

Various methods of payment may be employed. If actual money is conveyed, this may be done by way of credit card, debit card, e-wallet, and the like, or the subscriber's account may be charged. Micro-payments may also be employed. In alternative embodiments, payments are made in non-monetary units such as tokens. Each cell phone of a mobile system, for example, may be allocated 1000 "service-improvement" tokens each month, which may be used to bid for improved, enhanced, or additional antenna-provided services. Thus, the price may be a number of dollars or euros, or a number of minutes or tokens, for example. As a variation of this embodiment, a cell phone subscriber may be allocated 500 minutes a month on a fixed payment plan, 30 minutes of which are "high quality". These 30 minutes may be used by the cell phone to "pay" for higher quality connections, when necessary. Payment may also be made in a type of barter transaction, for example an agreement to provide a desired task or service may be exchanged for a lobe extension.

The present invention may be implemented in a variety of communications systems, such as one in which a Bluetooth-enabled personal assistant is a mobile unit and a SNAP pod has a smart antenna which can selectively provide limited services to mobile units. In an embodiment, the base station antenna 201 may itself be mobile.

It is further understood that the mobile units controller and the like in the above described embodiments are each perfectly controlled by some form of processor executing software (firmware) developed in accordance with the teachings disclosed herein. It is believed that such software given the present disclosures teachings and other art is well within the wherewithal of one of ordinary skill in the art.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. In a communications system having an antenna and a plurality of mobile units in communication with the antenna, a method for allocating enhanced communications services comprising:
   establishing a price a mobile unit will pay to receive an enhanced communications service,
   transmitting an initial price for the enhanced communications service to the mobile units,
   receiving responses from one or more mobile units accepting the initial price,
   if too many or too few responses are received, then adjusting the price and transmitting the adjusted price until a market-clearing price is achieved,
   providing the enhanced communication service to the mobile units accepting the market-clearing price.

2. In a communications system having an antenna and a plurality of mobile units in communication with the antenna, a method for allocating enhanced communications services comprising:
   transmitting a message to the plurality of mobile units indicating that said enhanced communications service is available for bid,
   receiving bids from one or more bidding mobile units bidding for the enhanced communications service,
   allocating said enhanced communications service to one or more of the bidding mobile units in accordance with said bids.

3. The method of claim 2, receiving with the antenna a request for the enhanced communications service from at least one mobile unit, and in response to the request, transmitting the message to the plurality of mobile units indicating that said enhanced communications service is available for bid.

4. In a communications system having an antenna and a plurality of mobile units in communication with the antenna, a method for allocating enhanced communications services comprising:
   establishing a price a mobile unit will pay to receive an enhanced communications service,
   receiving bids from one or more bidding mobile units bidding for the enhanced communications service,
   allocating said enhanced communications service to one or more of the bidding mobile units in accordance with said bids.

5. The method of claim 4,
   providing the enhanced communication service to the mobile unit paying the price,
   paying, with the mobile unit receiving the enhanced communications service, the established price for said enhanced communications service.

6. In a communications system having an antenna and a mobile unit in communication with the antenna, a method for allocating enhanced communications services, comprising:
   establishing a price a mobile unit will pay to receive an enhanced communications service; and
   providing the enhanced communications service to the mobile unit, upon acceptance of the established price, by extending a lobe from the antenna toward the mobile unit.

7. The method of claim 6, the enhanced communications service comprises an improved signal-to-noise (S/N) ratio of a communications link between the mobile unit and the antenna, providing the enhanced communications service to the mobile unit accepting the price by extending a lobe toward the mobile unit to improve the S/N ratio of said communications link.

8. The method of claim 6, the enhanced communications service comprises a higher bandwidth communications link between the mobile unit and the antenna, providing the enhanced communications service to the mobile unit accepting the price by extending a lobe toward the mobile unit to improve the bandwidth of said communications link.

9. The method of claim 6, allocating a comparatively higher bit rate communications link to said mobile unit accepting the price.

10. In a communications system having an antenna and a plurality of mobile units in communication with the antenna, a method for allocating enhanced communications services comprising:
    establishing a price a mobile unit will pay to a second mobile unit currently having an enhanced communications service;
    releasing the enhanced communications service, with the second mobile unit, in favor of the mobile unit.

11. A mobile unit for use in a communications system providing an enhanced communications service, the mobile unit comprising:

a transceiver for communicating with the communications system;

means for receiving from the communications system a message transmitted to a plurality of mobile units indicating that said enhanced communications service is available for bid;

means for placing a bid, at a certain price, for the enhanced communications service; and means for receiving the enhanced communications service from the communications system if the communications system accepts the bid.

12. The method of claim 11, the mobile unit further comprising:

means requesting the enhanced communications service from the communications service; means for receiving from the communications system a message in response to the request indicating that said enhanced communications service is available for bid.

13. A mobile unit for use in a communications system providing an enhanced communications service, the mobile unit comprising:

a transceiver for communicating with the communications system, the enhanced communications service having an improved signal-to-noise (S/N) ratio for communications between the mobile unit and the communications system;

means for establishing a price that the mobile unit will pay to receive the enhanced communications service;

means for receiving the enhanced communications service provided to the mobile unit from the communications system by extending a lobe toward the mobile unit.

* * * * *